(12) United States Patent
Schuit et al.

(10) Patent No.: US 9,837,955 B1
(45) Date of Patent: Dec. 5, 2017

(54) ASSEMBLY FOR MOUNTING A TRIM PIECE TO A PHOTOVOLTAIC PANEL USING STANDARDIZED CLAMPS

(71) Applicant: Unirac Inc., Albuquerque, NM (US)

(72) Inventors: Nathan Schuit, Edgewood, NM (US); Todd Ganshaw, Sr., Albuquerque, NM (US); Tom Young, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 15/172,735

(22) Filed: Jun. 3, 2016

(51) Int. Cl.
| A47G 29/02 | (2006.01) |
| H02S 20/23 | (2014.01) |
| H02S 30/10 | (2014.01) |

(52) U.S. Cl.
CPC .............. *H02S 20/23* (2014.12); *H02S 30/10* (2014.12)

(58) Field of Classification Search
CPC ......... H02S 20/23; H02S 30/10; F24J 2/4609; F24J 2/465; F24J 2/526; F24J 2/5245; F24J 2/5211; F24J 2/5254; F24J 2002/5294
USPC ........................................................ 248/237
See application file for complete search history.

(56) References Cited

U.S. PATENT DOCUMENTS

| 7,260,918 | B2 | 8/2007 | Liebendorfer |
| 7,434,362 | B2 | 10/2008 | Liebendorfer |
| 7,766,292 | B2 | 8/2010 | Liebendorfer |
| 8,128,044 | B2 | 3/2012 | Liebendorfer |
| 8,191,321 | B2 * | 6/2012 | McClellan .......... E04D 13/0445 126/623 |
| 8,273,981 | B2 | 9/2012 | Kobayashi |
| 8,650,813 | B2 | 2/2014 | Botkin et al. |
| 8,695,290 | B1 * | 4/2014 | Kim ...................... F24J 2/5252 248/225.11 |
| 8,748,733 | B2 | 6/2014 | Leary |
| 8,763,316 | B2 | 7/2014 | Concho et al. |
| 8,938,932 | B1 | 1/2015 | Wentworth et al. |
| 9,052,123 | B2 | 6/2015 | Anderson et al. |
| 9,291,369 | B2 | 3/2016 | West et al. |
| 2011/0001030 | A1 | 1/2011 | Hochreiter et al. |
| 2012/0301661 | A1 * | 11/2012 | West ...................... F24J 2/5211 428/99 |
| 2013/0011187 | A1 | 1/2013 | Schuit et al. |
| 2015/0101655 | A1 | 4/2015 | Schuit et al. |
| 2015/0129517 | A1 | 5/2015 | Wildes |
| 2015/0180405 | A1 | 6/2015 | West et al. |
| 2015/0288320 | A1 | 10/2015 | Stearns et al. |
| 2016/0043688 | A1 | 2/2016 | McPheeters et al. |
| 2017/0133977 | A1 * | 5/2017 | Tripp ...................... H02S 30/10 |

\* cited by examiner

*Primary Examiner* — Christopher E Garft
(74) *Attorney, Agent, or Firm* — Crowell & Moring LLP

(57) ABSTRACT

A monolithic trim piece is used for covering an opening between the edge of a photovoltaic module and the roof. The trim piece, with a curved front face, is attached to the underside of the photovoltaic module(s) using a standardized end-clamp (for a single module) or a standard midclamp (for a pair of modules). A threaded fastener with a T-shaped head can be used in a recessed channel located underneath an attachment flange of the trim piece.

22 Claims, 7 Drawing Sheets

SECTION A-A

SECTION A-A

ASSEMBLY FOR MOUNTING A TRIM PIECE TO A PHOTOVOLTAIC PANEL USING STANDARDIZED CLAMPS

CROSS-REFERENCE TO RELATED APPLICATIONS

Cross-reference to U.S. patent application Ser. No. 15/138,018, filed Apr. 25, 2016, titled HEIGHT ADJUSTABLE SOLAR PANEL MOUNTING ASSEMBLY, U.S. patent application Ser. No. 15/138,030, filed Apr. 25, 2016, titled HYBRID SOLAR PANEL MOUNTING ASSEMBLY, U.S. patent application Ser. No. 13/179,278, filed Jul. 8, 2011, titled UNIVERSAL END CLAMP, now U.S. Patent Application Publication 2013/0011187 A1, published Jan. 10, 2013, and its divisional, U.S. patent application Ser. No. 14/575,554, filed Dec. 18, 2014, titled APPARATUS AND METHOD FOR MOUNTING A PHOTOVOLTAIC MODULE, now U.S. Patent Application Publication 2015/0101655 A1, published Apr. 16, 2015, is hereby made, and the disclosures supplied by each of these applications is expressly incorporated herein by reference as non-essential material.

BACKGROUND OF THE INVENTION

The solar industry is growing world-wide and, as a result, more-efficient structures are desirable for mounting photovoltaic modules to a structure, such as a roof of a home or other building. Whereas many different structures are known, there is a desire to reduce the complexity of such structures, and improve the efficiency of such structures. This can be achieved, in one respect, through the use of standardized parts, such as clamping elements (clamps).

SUMMARY OF THE INVENTION

According to the present invention, a monolithic trim for covering an opening between a distal edge of a photovoltaic module and a roof includes a front face, having a curved vertical profile, a vertical height, and a horizontal longitudinal length, defining a longitudinal axis, and a horizontal attachment flange, having a width, that is integral with the front face. Attachment means for removably attaching the trim to an underside of the photovoltaic module using a standardized end-clamp are included in the trim, with the attachment flange having a recessed channel of a length equal to the horizontal longitudinal length of the front face disposed underneath an upper surface thereof and oriented parallel to the longitudinal axis. The recessed channel includes a pair of internal shoulders that define a slot that is oriented parallel to the longitudinal axis and has a length that is equal to the horizontal longitudinal length of the front face.

The monolithic trim further includes a vertical stop bar, disposed at an intersection between the attachment flange and the front face, that is oriented parallel to the longitudinal axis and has a length equal to the horizontal longitudinal length of the front face. The slot mentioned has a width that is sufficiently wide so as to pass through a T-shaped head of a threaded fastener.

The length of the monolithic trim is greater than the width or height, with the height being approximately 1 to 2 times the width. A photovoltaic module is to be disposed in contact with the attachment flange of the trim and abut against the vertical stop bar. In one preferred configuration, the curved vertical profile of the front face of the trim has a prominent bulge located at a vertical distance equal to approximately 75% of said vertical height as measured vertically from a bottom edge of the trim, and at a horizontal distance equal to approximately 25% of said vertical height as measured horizontally from a vertical plane that goes through the bottom edge of the trim and an intersection between the front face and the attachment flange. The trim can be made of a suitable material, such as an anodized aluminum alloy.

DETAILED DESCRIPTION OF THE INVENTION

Decorative trim (skirt) pieces generally comprise long, slender channel-like sections of metal (or plastic) that are typically attached to the bottom edge (i.e., south end) of an array of solar panels (photovoltaic modules) and cover the open space between the roof and the modules. In addition to being decorative, the trim can improve aesthetics by hiding exposed wires and rails behind the trim. The trim can also serve as a wind deflector to stop or reduce wind from flowing underneath the photovoltaic (PV) modules, thereby improving the array's fire resistance. A trim piece can also serve as a "critter stop" to prevent animals and insects from nesting underneath the panels. In some versions, custom brackets are used to attach the trim to either the PV modules themselves, or to a rigid structure (e.g., structural rails, roof mounts) that supports the modules.

In the present invention, the decorative trim pieces are removably attached to an underside of the PV modules by using the same standardized end-clamps/mid-clamps that are used elsewhere in the array for attaching the PV modules to the structural mounts (e.g., structural rails, micro-rails). This approach simplifies installation, reduces SKU counts, and reduces costs. In addition, the end-clamps/mid-clamp assembly can provide for integrated electrical bonding between adjacent PV modules and the trim. The trim sections are directly attached to the overhanging (cantilevered) part of the PV modules that sticks out past the last structural support (e.g., structural rail), without the use of any specialized brackets or holders. The trim is typically attached after the PV modules have been mounted.

The term "standardized clamps" means that the clamps that are used to attach the trim piece to the PV modules are the same, standardized clamps (and nuts and bolts) that are used to attach the PV modules to structural supports on the roof (e.g., I-beam rails, or rail-less mounts).

Figure 1A:
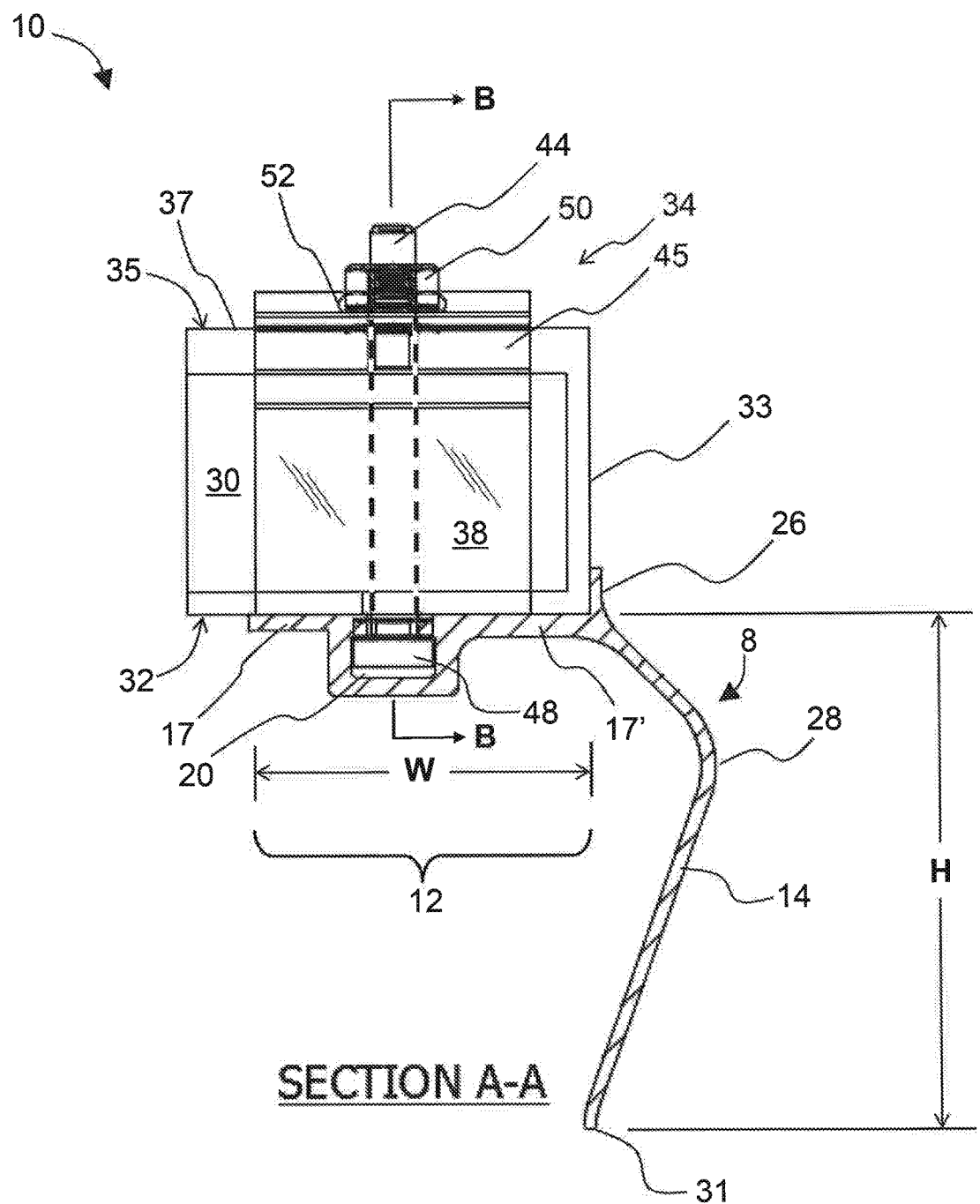
FIG. 1A shows a cross-section, end view of a first embodiment of a trim piece attached to a photovoltaic (PV) module, according to the present invention.

FIG. 1A shows a cross-section, end view of a first embodiment of a trim piece, or simply "trim," 8 attached to a photovoltaic (PV) module 30, according to the present invention. Trim piece 8 comprises a horizontal attachment flange 12 of width=W, and an integral (monolithic) curved vertical face 14 of vertical height=H. Trim 8 can comprise an extruded vertical profile, which has a longitudinal axis of length=L. The length=L is much greater than dimensions H and W. The height, H, can be about 1.5 times the width, W. Alternatively, the height, H, can range from 1 to 2 times the width, W. A vertical (raised) stop bar 26 is located on trim 8 at the intersection between attachment flange 12 and curved front face 14, and it (bar 26) runs parallel to the longitudinal axis, L. Attachment flange 12 comprises an upper surface 16, 16' and a lower surface 18 of a horizontal plate 17, 17', and further comprises a recessed channel 20 that runs parallel to the long axis of trim 8 along the length, L, of trim 8. Disposed inside of channel 20 are a pair of internal shoulders 22, 22', and an access slot 24 disposed in-between the pair of shoulders 22, 22', which together define an open volume 25. Access slot 24 and channel 20 run the length, L, of trim 8.

Figure 6A:
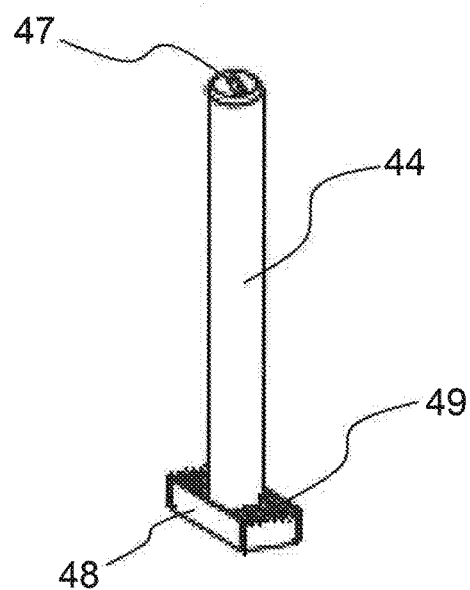
FIG. 6A shows an isometric, perspective view of an embodiment of a serrated T-bolt, according to the present invention.
Figure 6B:
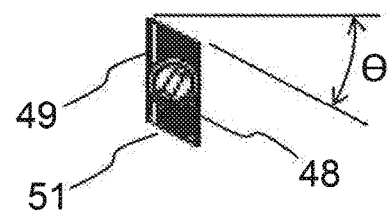
FIG. 6B shows a top view of an embodiment of a serrated T-bolt head, according to the present invention.

Recessed channel 20 is sized appropriately to receive a T-shaped head 48 of a vertically-oriented, threaded T-bolt fastener 44. In other words, the slot 24 has a width that is sufficiently wide so as to pass the T-shaped head 48 of threaded fastener 44 when the T-shaped head 48 is oriented parallel to the longitudinal axis. After inserting the T-shaped head 48 into slot 24 and recessed channel 20, the fastener 44 is rotated 90 degrees, so that the T-shaped head 48 locks against the pair of internal shoulders 22 and 22'. As shown in FIGS. 6A and 6B, T-shaped head 48 of fastener 44 comprises a plurality of sharp serrations 49 (sharp points) that serve to penetrate an anodized coating on the aluminum trim (in this example penetrating the anodized lower surfaces of internal shoulders 22, 22'), and a notch or kerf 47 to facilitate rotating the fastener after the T-shaped head is inserted into the slot 24. Penetrating the anodized coating provides good electrical contact between trim piece 8 and conductive T-bolt 44. Threaded fastener 44 further comprises a threaded shank 46 (FIG. 3), and a flanged nut 50 that has a plurality of radial serrations disposed underneath a bottom flange 52. Trim piece 8 can be made of an extruded aluminum alloy that can be clear (un-anodized) or anodized black (or some other color). The front face 14 of trim piece 10 has a curved profile, and comprises a prominent bulge 28 that is located approximately 75% of the distance up the vertical height, H, from the bottom edge 31 of trim 8. Prominent bulge 28 sticks out horizontally past a vertical plane that passes through stop bar 26 and bottom end 31, for a horizontal distance approximately equal to 25% of distance, H.

Figure 2:
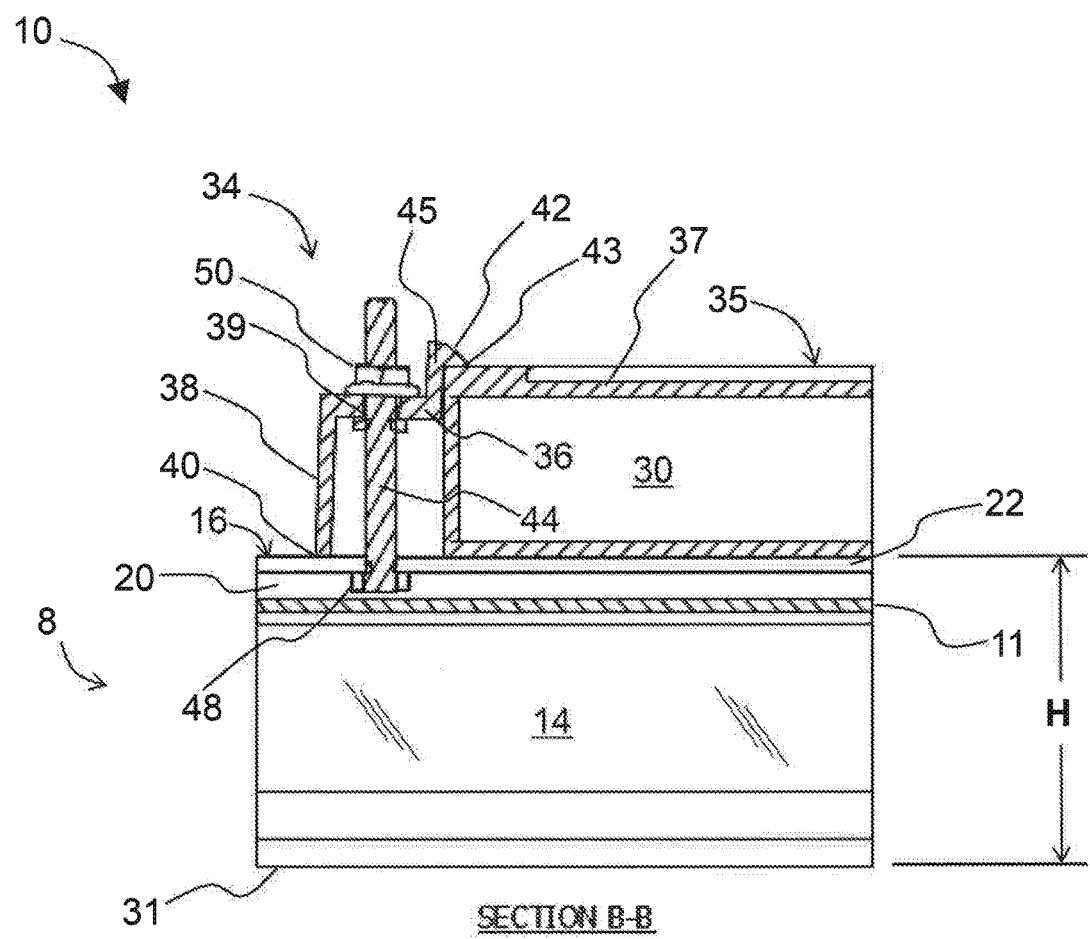
FIG. 2 shows a cross-section side view of a first embodiment of a trim piece attached to a PV module with an end-clamp, according to the present invention.

The example of an assembly 10 illustrated in FIG. 1A further comprises a PV module 30 that has a lower surface or underside 32, an upper surface 35, and a distal (southern) edge 33. Module 30 is removably mounted on the upper surface 16, 16' of attachment flange 12 of trim piece 8; and is removably clamped to flange 12 by a bracket 34 (which can be an end-clamp or a mid-clamp). Bracket 34 is made of a metallic alloy (typically aluminum alloy or stainless steel), and comprises a horizontal base plate 36 with a central aperture 39. In the case of an end-clamp, as shown in FIG. 1A and FIG. 2, base plate 36 is joined to a vertical straight leg 38 on one side, and is joined by an upstanding flange or wall 45 to a tapered, overhanging horizontal wing 42 on the other side. Wing 42 overhangs over, and rigidly clamps onto, the upper surface 35 of PV module 30. The lower surface of wing 42 can comprise a plurality of sharp serrations 43 or sharp points that serve to penetrate an anodized coating of the aluminum perimeter frame 37 of PV module 30. Vertical leg 38 comprises a bottom edge 40 that is firmly clamped against the upper surface 16 of attachment flange 12 by bolt 44 and nut 50. When assembled, the distal edge 33 of PV module 30 butts up against, and aligns to, stop bar 26.

Figure 1B:
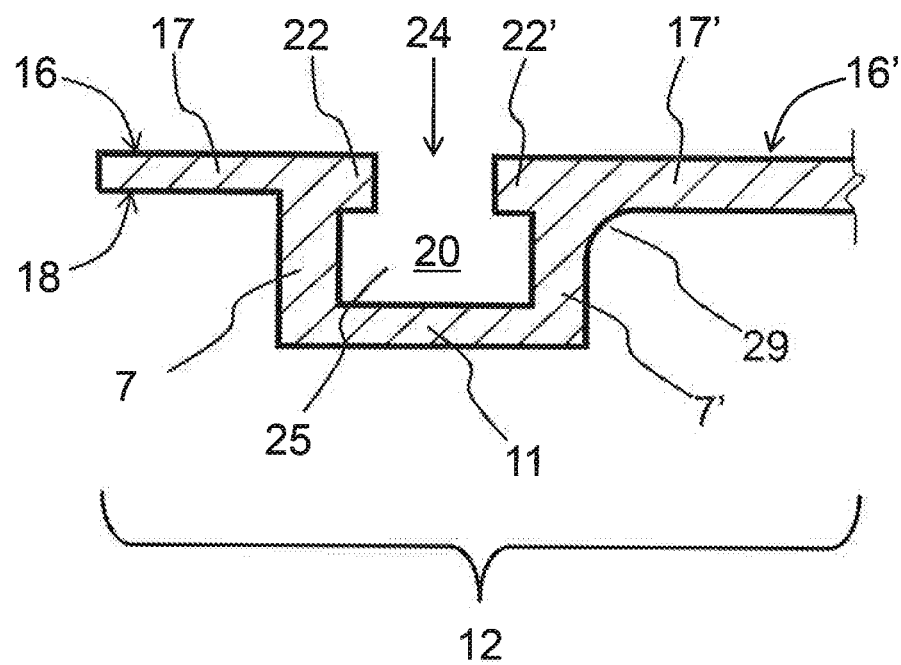
FIG. 1B shows a cross-section end view of the first embodiment of the attachment flange section of the trim piece, according to the present invention.

FIG. 1B shows an enlarged cross-section end view of the attachment flange section 12 of trim piece 8. Flange 12 comprises a horizontal plate 17, 17' with recessed channel 20, surrounded by lateral walls 7, 7' depending from the horizontal plate 17, 17', and a bottom wall 11 interconnecting the lateral walls 7, 7', disposed on the underside of plate 17, 17'. One or both of the junctions between the lateral walls 7, 7' and their respective horizontal plates 17, 17' may include a fillet or fillets 29 to reduce stress concentration and improve strength. Disposed inside of channel 20 are a pair of internal shoulders 22, 22', and an access slot 24 disposed in-between the pair of shoulders 22, 22', which together define an open volume 25. Recessed channel 20 and open volume 25 are sized to receive a T-shaped head 48 of a vertically-oriented, threaded T-bolt fastener 44. The attachment means for attaching the trim 8 to an underside 32 of the photovoltaic module 30 using an end-clamp 34 or mid-clamp 60 comprises: (a) a standardized end-clamp 34 or a standardized mid-clamp 60; and (b) a threaded bolt 44 and nut 50, wherein bolt 44 can comprise a threaded shank 46 and a T-shaped head 48 and serrations 49 on the T-shaped head 48; and wherein nut 50 can comprise a flanged bottom 52 with a plurality of radial serrations on the bottom surface of the flanged bottom.

FIG. 2 shows a cross-section side view of a trim piece 8 attached to a PV module 30 with an end-clamp. The bottom surface 32 of PV module frame 37 is removably clamped to the upper surface 16 of trim 8 using an S-shaped end-bracket 34 (end-clamp 34). End-clamp 34 comprises a horizontal plate 36 with an aperture 39 for accepting a threaded fastener 44. Plate 36 is joined to a monolithic, vertical descending member (leg) 38 on one side, and is joined to a monolithic, vertical ascending member (leg) 45 on the other side. Monolithically joined to the top of ascending member 45 is a tapered, overhanging horizontal wing 42. Wing 42 overhangs over, and rigidly clamps onto, the upper surface 35 of PV module 30. The lower surface (underside) of wing 42 can comprise a plurality of sharp serrations 43 or sharp points that serve to penetrate an anodized coating of the aluminum perimeter frame 37 of PV module 30. Vertical descending leg 38 comprises a bottom edge 40 that is firmly clamped against the upper surface 16 of attachment flange 12 by bolt 44 and nut 50.

Figure 3:
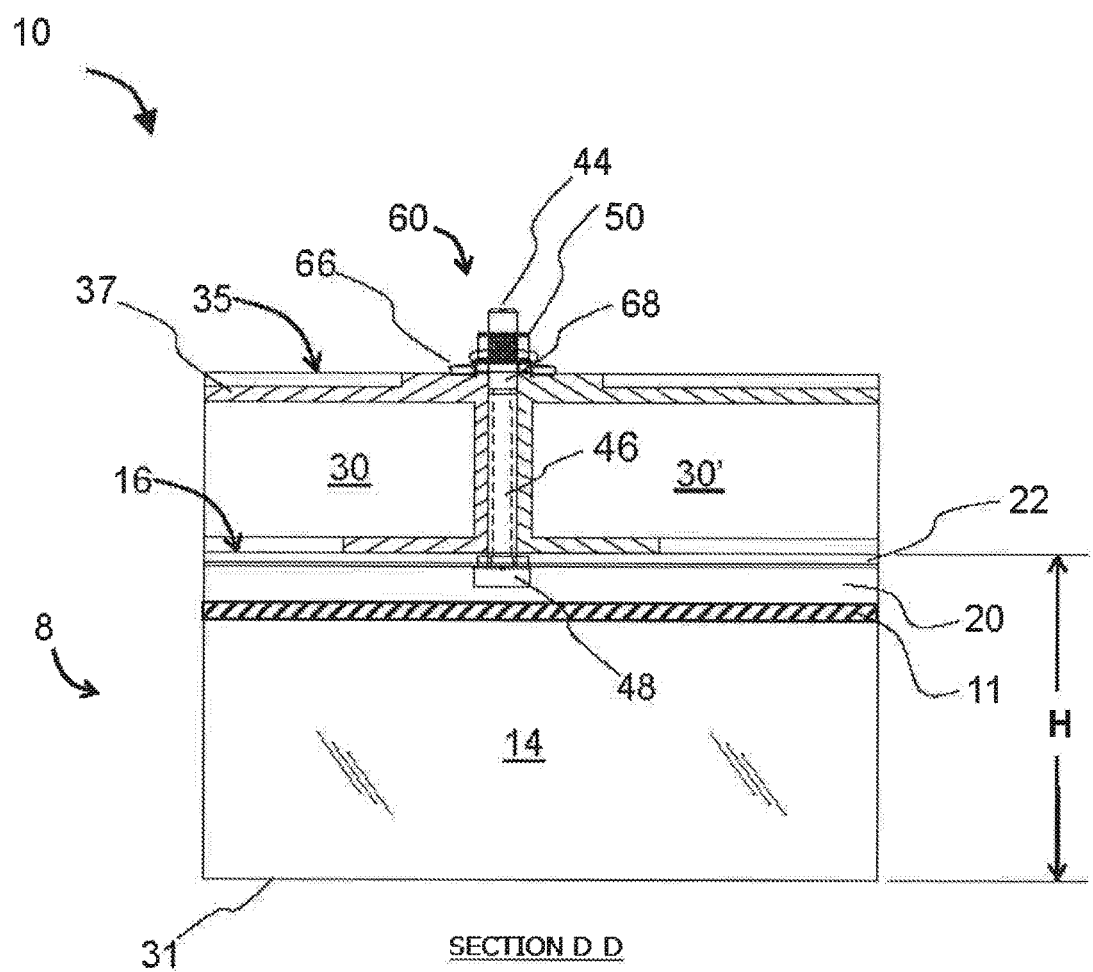
FIG. 3 shows a cross-section side view of a pair of photovoltaic modules attached to a first embodiment of a trim piece using a mid-clamp, according to the present invention.
Figure 5:
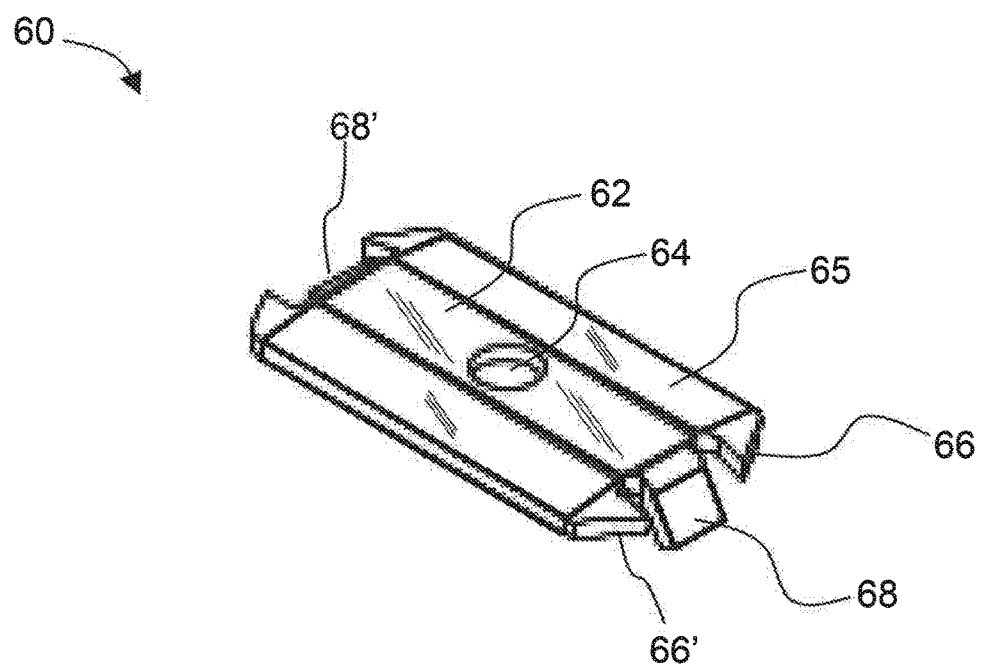
FIG. 5 shows an isometric, perspective view of an embodiment of a mid-clamp plate, according to the present invention.

FIG. 3 shows a cross-section side view of a pair of PV modules 30, 30' attached to a trim piece 8 using a mid-clamp 60. Trim 8 comprises a curved front face 14 and a recessed channel 20 for receiving a T-shaped head 48 of T-bolt fastener 44. Mid-clamp 60 (which is also shown in FIG. 5) comprises a flat, horizontal plate (washer) 62 that defines a hole 64 for accepting the shank of fastener 44. Plate 62 has a pair of turned-down (downfacing) tabs 68, 68' which serve to separate and space-apart the adjacent pair of PV modules 30, 30' by a predetermined distance. (Note that modules 30, 30' butt up against stop bar 26, which isn't shown in FIG. 3). Plate 62 further comprises two pairs of turned-down, sharp points 66, 66' that penetrate the anodized coating of PV modules 30, 30', respectively, when mounted and rigidly clamped. Use of these sharp points create an integrated electrical bonding path between adjacent PV modules 30 and 30'. Plate 62 is removably clamped with nut 50 on fastener 44. Nut 50 comprises a flange 52 with radial serrations underneath, which bite into the mating surface of the mating surface underneath the nut. Note: the end-clamps and mid-clamps can be make of stainless steel.

Figure 4:
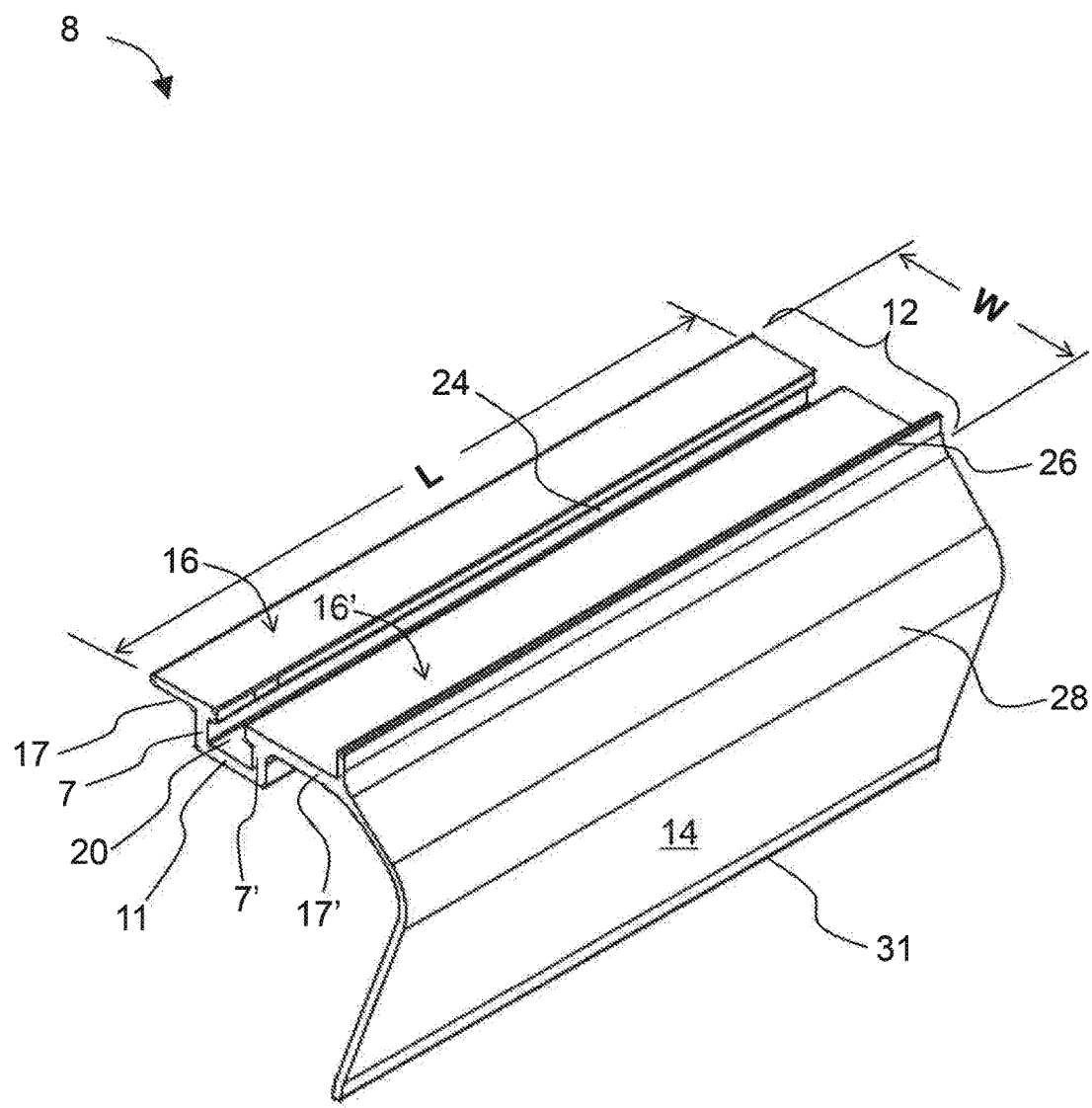
FIG. 4 shows an isometric, perspective view of an embodiment of a trim piece, according to the present invention.

FIG. 4 shows an isometric, perspective view of an embodiment of trim piece 8, according to the present invention. The longitudinal length, L, is much greater than the width, W, of attachment flange 12. Trim 8 comprises a horizontal attachment flange 12 monolithically joined to a vertical, curved front face 14 that has a prominent bulge 28 in the upper ¼ of the front face 14. Flange 12 comprises a horizontal plate 17, 17' with recessed channel 20 disposed on the underside of plate 17, 17'. Disposed inside of channel 20 are a pair of internal shoulders 22, 22', and an access slot 24 disposed in-between the pair of shoulders 22, 22', which together define an open volume 25. Recessed channel 20 and open volume 25 are sized to receive a T-shaped head 48 of a vertically-oriented, threaded T-bolt fastener 44.

FIG. 5 shows an isometric, perspective view of an embodiment of a mid-clamp plate 60. Mid-clamp 60 comprises a flat, horizontal plate (washer) 62 that defines a hole 64 for accepting the threaded shank of fastener 44. Plate 62 has a pair of turned-down tabs 68, 68' which serve to space-apart and define a specified distance in-between the adjacent pair of PV modules 30, 30'. Plate 62 further comprises two pairs of turned-down, sharp points 66, 66' at opposite ends of plates 65 that are attached to or integrally formed with lateral edges of the plate or washer 62. The sharp points 66, 66' penetrate the anodized coating on surface 35 of PV modules 30, 30', respectively, when mounted and rigidly clamped.

FIG. 6A shows an isometric, perspective view of an embodiment of a serrated T-bolt, according to the present invention. T-shaped head 48 of threaded bolt 44 comprises a plurality of serrations 49 that run along the length of T-shaped head 48 (i.e., perpendicular to the long axis of bolt 44). The plurality of serrations 49 serve to penetrate the anodized coating of an aluminum substrate, and create a good electrical bonding path from the bolt to the aluminum substrate (e.g., trim piece 10). In this example, serrations 49 bite into the bottom surfaces of internal shoulders 22 and 22'. As shown in FIG. 6B, the distal ends of T-shaped head 48 are cut (tapered) at an angle=⊖, where ⊖ can be about 40-50 degrees, so that the T-shaped head 48, in plan view, forms a parallelogram having longer sides 49 and shorter sides 51. This angled surface aides the insertion of T-shaped head 48 into channel 20 through slot 24.

Figure 7:
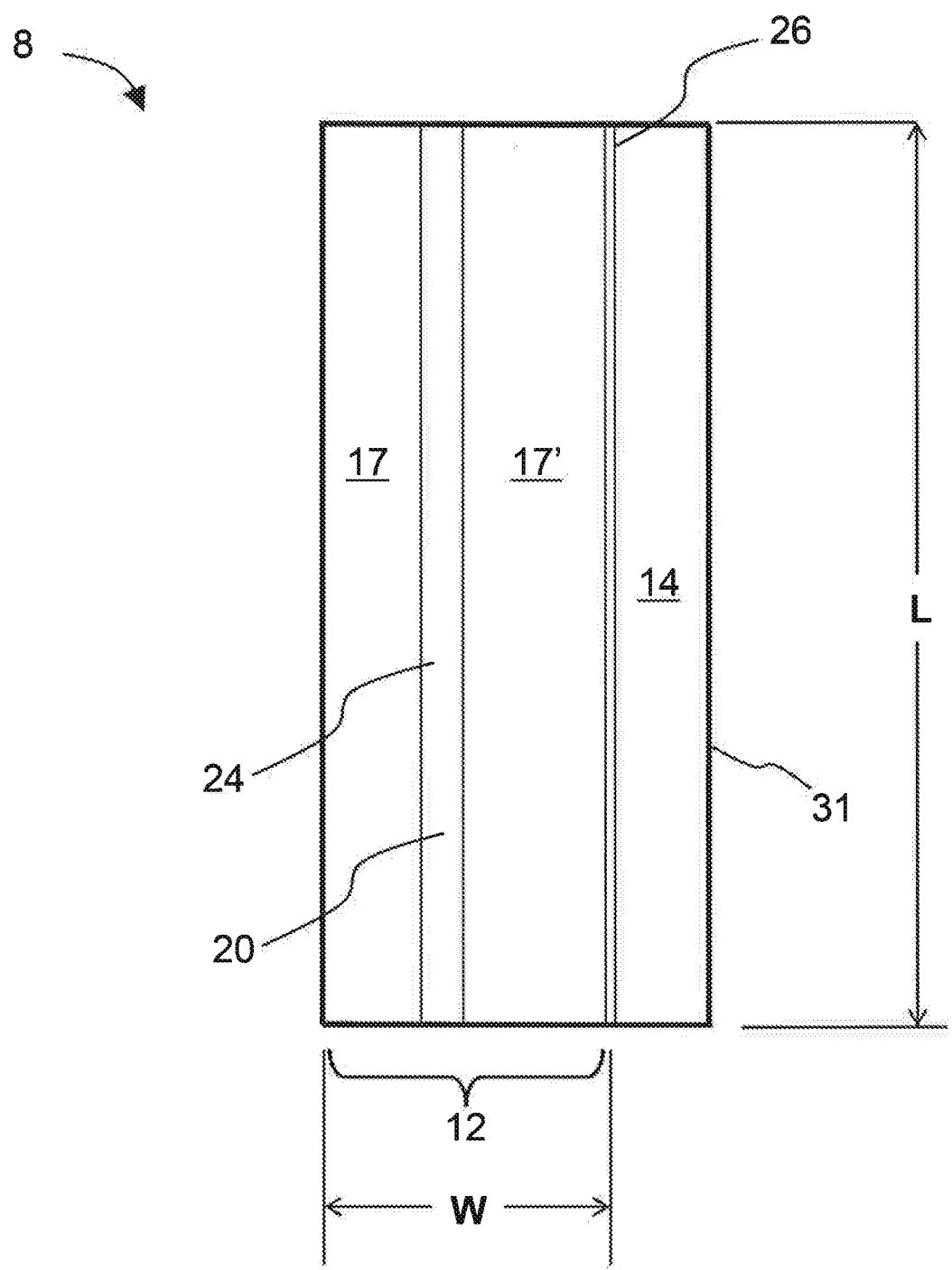
FIG. 7 shows a top view of an embodiment of a trim piece, according to the present invention.

FIG. 7 shows a top view of an embodiment of the trim piece 8, according to the present invention. Trim 8 has a longitudinal length, L, which is much greater than the width, W, of attachment flange 12. Recessed channel 20 runs parallel to the longitudinal axis, L, of trim 8, and comprises a longitudinal slot 24 that provides access to channel 20. Prominent bulge 28 can be seen in this view as the right-hand edge of the drawing in FIG. 7. Stop bar 26 runs parallel to the longitudinal axis, L.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A monolithic trim for covering an opening between a distal edge of a photovoltaic module and a roof, the monolithic trim comprising:
    a front face, having a curved vertical profile, a vertical height, and a horizontal longitudinal length, defining a longitudinal axis;
    a horizontal attachment flange, having a width, that is integral with the front face; and
    a stop element for photovoltaic module alignment, vertically protruding above the front face at an intersection between the attachment flange and the front face, that extends in a direction of the longitudinal axis.

2. The monolithic trim of claim 1, further comprising a channel in the attachment flange providing for removably attaching the trim to an underside of the photovoltaic module using a standardized end-clamp.

3. The monolithic trim of claim 2, wherein the channel is a recessed channel of a length equal to the horizontal longitudinal length of the front face disposed underneath an upper surface thereof and oriented parallel to the longitudinal axis.

4. The monolithic trim of claim 3, wherein the recessed channel comprises a pair of internal shoulders that define a slot that is oriented parallel to the longitudinal axis and has a length that is equal to the horizontal longitudinal length of the front face.

5. A monolithic trim for covering an opening between a distal edge of a photovoltaic module and a roof, the monolithic trim comprising:
    a front face, having a curved vertical profile, a vertical height, and a horizontal longitudinal length, defining a longitudinal axis;
    a horizontal attachment flange, having a width, that is integral with the front face; and
    a vertical stop bar, vertically protruding above the front face at an intersection between the attachment flange and the front face, that is oriented parallel to the longitudinal axis and has a length equal to the horizontal longitudinal length of the front face.

6. The monolithic trim of claim 4, wherein the slot has a width that is sufficiently wide so as to pass through a T-shaped head of a threaded fastener.

7. The monolithic trim of claim 1, wherein the length is greater than the width or height.

8. The monolithic trim of claim 1, wherein the height is 1.5 times the width.

9. The monolithic trim of claim 1, wherein the height is 1 to 2 times the width.

10. An assembly comprising the monolithic trim of claim 1, and further comprising a photovoltaic module in contact with the attachment flange of the trim.

11. An assembly comprising the monolithic trim of claim 5, and further comprising a photovoltaic module aligning to, and abutting against, the vertical stop bar.

12. The monolithic trim of claim 1, wherein the curved vertical profile of the front face comprises a prominent bulge located at a vertical distance of 75% of said vertical height as measured vertically from a bottom edge of the trim, and at a horizontal distance of 25% of said vertical height as measured horizontally from a vertical plane that goes through the bottom edge of the trim and an intersection between the front face and the attachment flange.

13. The monolithic trim of claim 1, wherein the trim is made of anodized aluminum alloy.

14. A monolithic trim for covering an opening between a distal edge of a photovoltaic module and a roof, the monolithic trim comprising:
- a front face, having a curved vertical profile, a vertical height, and a longitudinal length, defining a longitudinal axis;
- a horizontal attachment flange, having a width, that is integral with the front face;
- a channel providing for removably attaching the trim to an underside of the photovoltaic module using a standardized mid-clamp; and
- a stop element for photovoltaic module alignment, vertically protruding above the front face at an intersection between the attachment flange and the front face, that extends in a direction of the longitudinal axis.

15. A monolithic trim for covering an opening between a distal edge of a photovoltaic module and a roof, the monolithic trim comprising:
- a front face, having a curved vertical profile, a vertical height, and a longitudinal length, defining a longitudinal axis;
- a horizontal attachment flange, having a width, that is integral with the front face;
- a channel providing for removably attaching the trim to an underside of the photovoltaic module using a threaded fastener with a T-shaped head; and
- a stop element for photovoltaic module alignment, vertically protruding above the front face at an intersection between the attachment flange and the front face, that extends in a direction of the longitudinal axis.

16. A trim assembly for covering an opening between a distal edge of a photovoltaic module and a roof, the trim assembly comprising:
- a trim piece including a front face, having a curved vertical profile, a vertical height, and a longitudinal length, defining a longitudinal axis, a horizontal attachment flange, having a width, that is integral with the front face, a channel providing for removably attaching the trim piece to an underside of the photovoltaic module using a threaded fastener with a threaded shank and a T-shaped head, and a vertical stop bar, disposed at an intersection between the attachment flange and the front face, which is oriented parallel to the longitudinal axis and has a length equal to the longitudinal length of the front face;
- a photovoltaic module contacting an upper surface of the attachment flange, with a distal edge abutting against the vertical stop bar; and
- a standardized clamp, with a plate defining a hole, for rigidly clamping an edge of the photovoltaic module to the upper surface of the attachment flange;
- wherein the shank is disposed through said hole.

17. The trim assembly of claim 16, wherein the channel is a recessed channel of a length equal to the longitudinal length disposed underneath the attachment flange and oriented parallel to the longitudinal axis, and wherein the T-shaped head is oriented so as to be locked within the recessed channel.

18. The trim assembly of claim 16, wherein the photovoltaic module is one of a pair of photovoltaic modules contacting the attachment flange, and wherein the standardized clamp comprises a mid-clamp.

19. The trim assembly of claim 16, wherein the clamp further comprises a plurality of sharp points for penetrating an anodized coating of an aluminum alloy substrate.

20. The trim assembly of claim 16, wherein the T-shaped head of the threaded fastener includes a plurality of sharp points or serrations for penetrating an anodized coating of an aluminum alloy attachment flange.

21. The trim assembly of claim 18, wherein the mid-clamp includes a pair of downfacing tabs that separate and space apart the pair of photovoltaic modules by a predetermined distance.

22. The monolithic trim of claim 1, wherein the stop element is a vertical stop bar.

\* \* \* \* \*